United States Patent Office 2,967,834
Patented Jan. 10, 1961

2,967,834

PREPARATION OF SOLID METAL HALIDE POLYMERIZATION CATALYSTS

John H. Daniel, Jr., Old Greenwich, and Donald F. Rossler, Stamford, Conn., assignors to American Cyanamid Company, New York, N.Y., a corporation of Maine No Drawing. Filed Feb. 13, 1958, Ser. No. 714,959

8 Claims. (Cl. 252—429)

This invention relates to a novel catalyst system suitable for use in preparing polymeric materials, of the type which have a substantially ordered or oriented molecular structure. More specifically, the present invention provides a novel method for facilitating the use of solid catalysts of the type which readily deteriorate on exposure to air or moisture and which would thereby be rendered ineffective for the preparation of polymers of this type.

The present invention is particularly concerned with the procedures involved in the preparation of stereospecific polymers that frequently require the use of labile catalysts that are adversely affected by exposure to air and moisture. Stereospecific polymers are those polymers distinguished by a regularity of configuration either with respect to the main backbone chain of the polymer or with respect to the pendant group or groups attached to the main chain of the polymer; or with respect to both the main chain and the pendant group or groups. Examples of regularity of pendant groups are the isotactic polymers and syndiotactic polymers where similar groups are on the same side or alternate sides of the backbone chain, respectively, when the backbone chain is represented by a linear combination of atoms in the plane of the paper, that is, —C—C—C—C—. Examples of polymeric compositions having regularity of the backbone chain, are the predominantly 1,4-cis-isoprene structure of natural rubber and the 1,4-trans-isoprene structure of balata or gutta-percha.

Stereospecificity in a polymer allows for a closer packing of the molecules resulting in properties markedly different from the usual nonstereospecific polymer. In addition to their use for the preparation of stereospecific polymers, the catalysts of the invention may also be used to prepare polyethylene of the type that is distinguished by a high degree of linearity and by the absence of many branched chains. Such polyethylene differs from that made by high pressure, free radical techniques, which is characterized by frequent branching of the polymer chain. This difference between the two types of polymers is manifested by a greater rigidity and higher softening point of the more linear product obtained by the use of the solid heterogeneous catalysts of the type with which the invention is concerned.

A further advantage of the linear type polyethylene as well as the stereospecific alpha-olefinic polymers, such as isotactic polypropylene, polybutene, polystyrene, etc., is their marked tendencies to crystallize. In the case of the linear type polyethylene, the degree of crystallinity is of a higher order than that obtained in the branched type made by free radical catalysts.

In the preparation of polyethylene and stereospecific polymers from alpha-olefinic and 1,3-diolefinic compounds, such as propylene, styrene, and butadiene-1,3, it is known, for example, that the quantity and nature of of the polymers derived from the polymerization reaction are strongly affected by the purity of the catalyst. The employment of these catalysts has heretofore presented considerable difficulty due to the fact that they are easily attacked by oxygen and moisture.

Briefly, the invention comprises the preparation of a stable dispersion of a solid metal halide catalysts component in a polymer solution or suspension so that it may be exposed to air while it is charged to the reaction vessel or otherwise manipulated without deteriorating or loss in effectiveness. The metal halide catalysts with which the present invention is essentially concerned are halides of the transition metals of group IVB to group VIB of the periodic system which are substantially insoluble in hydrocarbons at normal temperatures, i.e. temperatures in the range of from about 10° C. to about 120° C. These metals include titanium, vanadium, chromium, zirconium and tungsten, etc.

It is an object of the present invention to provide a method of preparing a transition metal halide catalyst which is stable and may be usefully employed, even when exposed to the atmosphere, for the preparation of polymeric materials. Further objects and advantages will become apparent from the more detailed description of the invention which follows.

In view of the high sensitivity to oxygen and moisture, the metal halide catalysts of the transition metals with which the present invention are concerned have been heretofore introduced into the polymerization reaction by such means as glass ampoules, which contain the catalyst and which are ruptured in the system by steel balls. Another technique which has been attempted is the dispersion of the titanium halide in a carrier, such as mineral oil, petrolatum or paraffin wax. In each of these instances, however, the removal of the carrier or glass has presented a major problem.

The present invention obviates these former difficulties by employing a dispersion medium which is of essentially the same chemical composition as the desired product. The procedure involves making a catalyst composition comprising a metal halide combined with a polymeric material and a solvent so that the transition metal halide catalyst is in a condition which renders it stable to the atmosphere and thereby avoids the severely restricting precaution formerly required in the use of these catalysts. The procedure employed in stabilizing the metal halide comprises adding the metal halide under an inert atmosphere to some of the polymer of the same kind which it is desired to prepare from the monomeric compound. The polymer is dispersed in a suitable hydrocarbon to provide a consistency for blending in the metal halide. Thus, when used to polymerize propylene, the catalyst may be a mixture of titanium trichloride and polypropylene together with small amounts of the solvent that will be used in the reaction. In the polymerization of styrene, the catalyst may be a titanium halide and polystyrene with a suitable solvent for the polystyrene, etc. The solvent for the polymeric compound is the same as or is compatible with the solvent used in carrying out the polymerization step.

In addition to the dichloride and trichloride of these transition metals, other halides of these metals, such as dichlorodibutoxytitanium [$TiCl_2(OC_4H_9)_2$], titanium tribromide, titanium triiodide, titanium tetrahydroxide, vanadium trichloride, chromium trichloride, zirconium trichloride, zirconium tetrachloride, tungsten hexachloride, and the like may be employed.

Suitable polymerizable compounds which are contemplated are ethylene; alpha-olefinic monomeric compounds such as proplyene, styrene, methlystyrene and the live; and 1,3-diolefins such as butadiene-1,3; isoprene; 2,3-dimethylbutadiene-1,3; 1,4-dimethylbutadiene-1,3; and the like.

In preparing the catalyst composition in a form which enables its free exposure to the atmosphere prior to its use, the procedure employed is to dissolve a quantity of polymer in a suitable solvent and introduce thereto the transition metal halide.

The specifications for the polymer that is employed for combining with the transition metal halide and the solvent to give the dispersion are not very restrictive. A form of the polymer should be used that is at least partially soluble in the desired solvent. For example, a soluble form of polystyrene is generally preferred in making up dispersions with this polymer rather than the relatively insoluble isotactic form of polystyrene. Generally, low molecular weight polymers should be avoided, particularly if their presence in the finished product would be undesirable.

Suitable solvents for the polymer employed in preparing the catalyst are the aliphatic compounds having up to 20 carbon atoms or aromatic hydrocarbons. Examples of such solvents are butane, n-hexane, n-pentane, toluene, xylene, napthalene and the like. Halogenated hydrocarbons, such as o-dichlorobenzene or chloronaphthalene may also be employed.

The catalyst prepared according to the invention may then be employed in the known manner in conjunction with organo-metallic compounds of metals of group I to group III of the periodic system in initiating polymerization. Generally alumium organic compounds are utilized. As such are the trialkylaluminum compounds containing alkyl radicals up to 8 carbon atoms, i.e. methyl, ethyl, propyl, butyl, isopropyl or isobutyl radicals, for example, or mixtures of such radicals. Illustrative specific compounds of this type are such as triethyl aluminum, triisobutyl aluminum, diethylaluminum monochloride, monoethylaluminum dichloride and the like.

Other organo-metallic compounds include lithium, beryllium, magnesium, zinc, cadmium in which the metal is bonded to an alkyl radical, as named above. Specific illustrative examples include, butyl lithium, diethyl magnesium, and diethyl beryllium.

The relative amounts of transition metal halide of the aforementioned group to polymer and solvent therefore to be blended therewith may vary within wide limits. Generally relative amounts by weight of polymer to solvent to meal halide are within the range of from about 0.1:1:1 to about 10:200:1 are preferably utilized.

The ratio of transition metal halide to monomeric material to be polymerized may be employed in amounts ranging from about 0.01 to about 10 per cent by weight and preferably in amounts of from 0.05 to 5% by weight based on the polymerizable compound.

The weight ratio of transition metal halide to organo metal cocatalyst may vary from about 1:0.2 to about 1:20, but is preferably maintained within the ratio range of from about 1:0.5 to 1:10, respectively.

In order that the invention may be more fully understood, the following examples are given by way of illustration and not by way of limitation. All parts are parts by weight unless otherwise expressly stated.

EXAMPLE 1

*Catalyst preparation*

15.0 parts of n-heptane and 4.6 parts of a polypropylene that is soluble in hot heptane are heated while stirring, until the polymer dissolves and forms a hazy solution with the n-heptane. The container is then placed in an atmosphere which is then freed of moisture and oxygen by displacing the air with pure nitrogen. A dry nitrogen stream is maintained during the cooling of the heptane-polypropylene mixture.

While maintaining an inert atmosphere, 1.1 parts of titanium trichloride is mixed with the gelatinous slurry of polypropylene and n-heptane, forming a purple mixture having a consistency similar to petrolatum. This material is then placed in glass jars, capped and sealed. The catalyst composition is preferably introduced into the storage jars under substantially dry and inert conditions in order to extend the shelf life of the catalyst.

When needed, the contents of the bottles are transferred freely in the atmosphere to the polymerization reactor. The catalyst slurry remains stable for a long period so that one preparation suffices for many polymerization runs. Use of the catalyst preparation follows the techniques employed by the prior art with the exception that the strict precaution to exclude contamination of catalyst, required by the prior art, is unnecessary.

*Polymerization of propylene*

A suitable polymerization reaction vessel (stainless steel) is thoroughly dried and flushed with nitrogen and 8.18 parts of the titanium trichloride catalyst composition, as above prepared (cont. 0.434 part $TiCl_3$), is introduced into the vessel which is then sealed and evacuated for 15 minutes.

150 parts of n-heptane is added to a separate sealable charging vessel and nitrogen is bubbled through the solution to displace air from this vessel. 4.3 parts of aluminum triethyl [$Al(C_2H_5)_3$], 24.9% solution in heptane] is added to the heptane in the vessel under a blanket of nitrogen. The charging vessel is sealed and the vessel filled with nitrogen to 250 p.s.i.g. pressure.

The aluminum triethyl in heptane solution is then transferred to the reaction vessel by means of the nitrogen pressure in the charging vessel. Agitation (rocking) is started and the vessel is heated to 60° C. by external electrical heaters.

Propylene is then introduced into the reactor by means of a second charging vessel. The pressure in the polymerization vessel rises to 200 p.s.i.g. The temperature is then raised to 85° C., and the pressure to 350 p.s.i.g. The reaction is continued for 24 hours at 85° C. during which time the pressure falls to 200 p.s.i.g.

After cooling and venting the reaction vessel, 32.1 parts of solid polymer is obtained which is washed in methanol until free of residual catalyst. The polymeric product has a M.P. of 159–165.5° C. as determined on a Fisher-Johns apparatus.

EXAMPLE 2

*Catalyst preparation*

Polystyrene (Koppers 110) (2.5 parts) was partially dissolved in 14.9 parts benzene by heating for ½ hour and then cooled with stirring to form a uniform slurry. In an inert atmosphere of argon, 4.41 parts $TiCl_3$ is mixed with the slurry for 10 minutes to form a dispersion (20.2% $TiCl_3$ by weight) and then transferred to a screw-top bottle for storage.

*Polymerization of styrene*

Into a suitable reaction vessel filled with helium is introduced 8.1 parts $TiCl_3$ dispersion (1.64 parts $TiCl_3$) and the vessel is evacuated and flushed three times with helium. 12 parts of freshly prepared $Al(C_2H_5)_3$ solution (30.5% in heptane) is added slowly. After the mixture was stirred for 1 hour at 70–80° C., 84.5 parts of styrene which has been passed through a column of activated $Al_2O_3$ was added dropwise, followed by 74.8 parts benzene and the temperature is held at 60° C. The reaction is continued for 75 hours.

The reaction mixture is then poured into methanol where the mass which forms is broken up, treated 1 hour with boiling methanol-HCl and washed several times with methanol. After the product is dried, it is extracted successively with boiling acetone and methyl-ethyl-ketone, to yield the following fractions: acetone soluble, 6.68 parts (5.6% conversion); methyl-ethyl-ketone soluble, 3.20 parts (2.7% conversion); and insoluble, 24.5 parts (20.6%). The insoluble fraction consisting of isotactic polystyrene, melting point 232–236° C., represents 71% of the polystyrene recovered.

EXAMPLE 3

Preparation of catalyst 3.0 parts of polyethylene and 38.4 parts of n-heptane are heated at 90–98° C. in a suitable vessel until a clear solution is formed. The solution is then allowed to cool. A viscous slurry is formed. The vessel containing the slurry is then transferred to a dry and inert nitrogen atmosphere. 0.42 part of $TiCl_3$ is added to the slurry and mixed thoroughly. A purple paste forms. The product, containing about 1.0% $TiCl_3$ is stored in sealed glass vessels until used.

Preparation of polyethylene 51.9 parts of the $TiCl_3$ slurry as above prepared is added to a sealable reaction vessel in the open atmosphere. The vessel is sealed, evacuated for 10 minutes and then flushed with nitrogen. This procedure is repeated three times to remove air and moisture from the reaction vessel. 1000 parts of n-heptane solvent is added to a separate charging vessel and purged with a rapid stream of nitrogen gas for 20 minutes. To this solvent, 6.98 parts of a heptane solution of $Al(C_2H_5)_3$ [30.5% $Al(C_2H_5)_3$ in n-heptane] is introduced from a stock solution which is protected from the atmosphere. The charging vessel containing the aluminum triethyl solution is placed under 250 p.s.i.g. nitrogen pressure so that the solution is added to the reaction vessel containing the catalyst composition by employing this pressure to feed the charge. The reaction mixture is agitated and heated to 50° C. At this point, 150 parts of ethylene is added to the vessel, and the pressure increased to 600 p.s.i.g. The temperature is raised to and maintained at 75° C. and the reaction carried out overnight (19 hours). The vessel is cooled and vented. The product is mixed with a large volume of methanol containing some concentrated HCl. On filtering, a white solid is isolated, which is washed twice with methanol, filtered, and dried in vacuo at 60° C. for 5 hours. The yield of polyethylene, after deducting the amount charged with slurry, is 13.4 parts or approximately 9% conversion.

EXAMPLE 4

Into a suitable glass reaction vessel fitted with electrically driven glass stirrer, gas inlet tube extending below surface of liquid, and a reflux condenser, the top of which was equipped with a $CaCl_2$ drying tube and which is flushed with $N_2$ for 20 minutes, is introduced 2500 parts of 99% n-heptane. Nitrogen is bubbled through the liquid for 20 minutes. 84.7 parts $TiCl_3$ slurry as prepared in Example 3 is charged into the vessel. 8.23 parts of $Al(C_2H_5)_3$ (30.5% solution) is then added. Thereafter the nitrogen gas stream is substituted by a stream of ethylene gas which is bubbled beneath the liquid surface in the reaction vessel during the run of 4½ hours. The temperature is raised and maintained at 70° C. The product was isolated by working up in methanol and concentrated HCl as described in Example 3. The yield of polyethylene obtained from the run less 6.1 parts charged with the slurry is 22.0 parts. In this example, the percent conversion is not accurately determinable as no record was kept of the amount of ethylene fed.

EXAMPLE 5

81.0 parts of the $TiCl_3$ slurry prepared according to the procedure of Example 1 (contained 4.3 parts $TiCl_3$) is added to a suitable reaction vessel. The vessel is sealed, evacuated, and flushed with nitrogen. The evacuation and flushing procedure is repeated and 200 parts of n-heptane solvent and the 125 parts of 25% solution of triisobutyl aluminum in n-heptane are then added to the vessel by means of a charging vessel under nitrogen pressure. Stirring is begun and the temperature is raised to about 50° C. Propylene is then fed into the vessel from a second charging vessel until the pressure in the reaction vessel is 250 p.s.i.g. The temperature is then raised to 85° C. and after a short period there is a sudden exotherm to about 110° C., and a rapid decrease in pressure. The temperature is controlled by cooling to about 98° C. and maintained at this figure for the duration of the run. As the pressure drops to about 150 p.s.i.g., more propylene is fed in from the charging vessel, bringing the pressure back to 250 p.s.i.g. This procedure is continued throughout the run. The total reaction time is 22 hours and the total propylene feed is 204 parts.

After cooling and venting the reaction vessel, the solid the product is collected, broken up and blended with methanolic HCl. It is then washed several times in methanol, filtered and dried in vacuo at 60°C. The yield of white solid polypropylene is 178 parts.

EXAMPLE 6

A dispersion of solid vanadium trichloride is prepared in the same manner as in Example 1. An amount of this dispersion equivalent to 3.2 parts of $VCl_3$ is charged to a suitable pressure reaction vessel which is then evacuated. Triethyl aluminum, 5.7 parts, dissolved in 69 parts of n-heptane is then added and the contents heated to about 80° C. While the vessel is maintained at this temperature, 98 parts of pure propylene is fed in. The operation is continued for 10 hours during which time the pressure gradually falls. A solid compact polymer is withdrawn from the reactor. This is purified by treatment with methanol and acid as described in the previous examples.

We claim:

1. A method for preparing an atmospheric stable metal halide catalyst component useful in conjunction with an organo-metallic cocatalyst for the preparation of linear polymers selected from the group consisting of polymers of ethylene, and of alpha-olefinic and 1,3-diolefinic polymerizable compounds, which comprises blending under inert atmospheric conditions; (A) a polymer of said group having the same composition as the polymer to be prepared, (B) a solvent for said polymer selected from the class consisting of aliphatic hydrocarbons having up to 20 carbon atoms, aromatic hydrocarbons and halogenated hydrocarbons (A), and (C) a finely divided metal halide of a transition metal selected from groups IVB to VIB of the periodic system, in a relative weight ratio of A to B to C in the range of 0.1:1:1 to 10:200:1, respectively said polymer forming a solution with said solvent.

2. A method for preparing an atmospheric stable titanium halide catalyst component useful in conjunction with an organo-metallic cocatalyst for the preparation of linear polymers selected from the group consisting of polymers of ethylene and of alpha-olefinic and 1,3-diolefinic polymerizable compounds, which comprises blending under inert atmospheric conditions; (A) a polymer of said group having the same composition as the polymer to be prepared, (B) a solvent for said polymer selected from the class consisting of aliphatic hydrocarbons having up to 20 carbon atoms, aromatic hydrocarbons and halogenated hydrocarbons (A), and (C) a finely divided titanium halide, in a relative weight ratio of A to B to C in the range of 0.1:1:1 to 10:200:1, respectively said polymer forming a solution with said solvent.

3. A method for preparing an atmospheric stable titanium trichloride catalyst component useful in conjunction with an organo-metallic cocatalyst for the preparation of linear polymers selected from the group consisting of ploymers of ethylene and of alpha-olefinic and 1,3-diolefinic polymerizable compounds, which comprises blending under inert atmospheric conditions; (A) a polymer of said group having the same composition as the polymer to be prepared, (B) a solvent for said polymer selected from the class consisting of aliphatic hydrocarbons having up to 20 carbon atoms, aromatic hydrocarbons and halogenated hydrocarbons (A), and (C) finely divided titanium trichloride, in a relative weight ratio of A to B to C in the range of 0.1:1:1 to 10:200:1, respectively said polymer forming a solution with said solvent.

4. The method of claim 3 wherein said polymer solvent is n-heptane.

5. A method for preparing an atmospheric stable metal halide catalyst component useful in conjunction with an organo-metallic cocatalyst for the preparation of isotactic polypropylene, which comprises blending under inert atmospheric conditions; (A) polypropylene, (B) a solvent for said polypropylene selected from the class consisting of aliphatic hydrocarbons having up to 20 carbon atoms, aromatic hydrocarbons and halogenated hydrocarbons, and (C) finely divided metal halide of a transition metal selected from groups IVB to VIB of the periodic system, in a relative weight ratio of A to B to C in the range of 0.1:1:1 to 10:200:1, respectively said polymer forming a solution with said solvent.

6. A method for preparing an atmospheric stable titanium halide catalyst component useful in conjunction with an organo-metallic cocatalyst for the preparation of isotactic polypropylene, which comprises blending under inert atmospheric conditions; (A) polypropylene, (B) a solvent for said polypropylene selected from the class consisting of aliphatic hydrocarbons having up to 20 carbon atoms, aromatic hydrocarbons and halogenated hydrocarbons, and (C) finely divided titanium halide, in a relative weight ratio of A to B to C in the range of 0.1:1:1 to 10:200:1, respectively said polymer forming a solution with said solvent.

7. A method for preparing an atmospheric stable titanium halide catalyst component useful in conjunction with an organo-metallic cocatalyst for the preparation of polyethylene, which comprises blending under inert atmospheric conditions; (A) polyethylene, (B) a solvent for said polyethylene selected from the class consisting of aliphatic hydrocarbons having up to 20 carbon atoms, aromatic hydrocarbons and halogenated hydrocarbons, and (C) a finely divided titanium halide, in a relative weight ratio of A to B to C in the range of 0.1:1:1 to 10:200:1, respectively said polymer forming a solution with said solvent.

8. A method for preparing an atomspheric stable titanium halide catalyst component useful in conjunction with an organo-metallic cocatalyst for the preparation of isotactic polystyrene, which comprises blending under inert atmospheric conditions; (A) polystyrene selected from the class consisting of aliphatic hydrocarbons having up to 20 carbon atoms, aromatic hydrocarbons and halogenated hydrocarbons; (B) a solvent for said polystyrene and (C) a finely divided titanium halide, in a relative weight ratio of A to B to C in the range of 0.1:1:1 to 10:200:1, respectively said polymer forming a solution with said solvent.

References Cited in the file of this patent

UNITED STATES PATENTS 2,822,357   Brebner _____ Feb. 4, 1958

UNITED STATES PATENT OFFICE
CERTIFICATION OF CORRECTION

Patent No. 2,967,834                        January 10, 1961

John H. Daniel, Jr., et al.

It is hereby certified that error appears in the above numbered patent requiring correction and that the said Letters Patent should read as corrected below.

Column 2, line 4, for "catalysts" read -- catalyst --; line 68, for "live" read -- like --; column 3, line 43, for "meal" read -- metal --.

Signed and sealed this 18th day of July 1961.

(SEAL)
Attest:

ERNEST W. SWIDER                        DAVID L. LADD
Attesting Officer                            Commissioner of Patents